United States Patent
Schombert

(10) Patent No.: US 10,988,324 B2
(45) Date of Patent: Apr. 27, 2021

(54) FOOD GRADE FEEDER DEVICE AND SYSTEM FOR ROLLS, SANDWICHES, ODD SHAPED EDIBLES AND FOODSTUFF

(71) Applicant: Greg Schombert, Knightstown, IN (US)

(72) Inventor: Greg Schombert, Knightstown, IN (US)

(*) Notice: Subject to any disclaimer, the term of this patent is extended or adjusted under 35 U.S.C. 154(b) by 0 days.

(21) Appl. No.: 16/389,868

(22) Filed: Apr. 19, 2019

(65) Prior Publication Data

US 2019/0322463 A1    Oct. 24, 2019

Related U.S. Application Data

(60) Provisional application No. 62/660,846, filed on Apr. 20, 2018.

(51) Int. Cl.
*B65G 15/02*    (2006.01)
*B65G 47/14*    (2006.01)

(52) U.S. Cl.
CPC .. *B65G 47/1464* (2013.01); *B65G 2201/0202* (2013.01)

(58) Field of Classification Search
CPC .... B65G 15/02; B65G 29/00; B65G 47/1464; B65G 47/256; B65G 2201/0202
USPC ................. 198/391, 392, 396, 580
See application file for complete search history.

(56) References Cited

U.S. PATENT DOCUMENTS

| | | | | |
|---|---|---|---|---|
| 3,065,841 A | * | 11/1962 | Stover | B65G 47/256 198/392 |
| 3,224,554 A | | 12/1965 | Moulder et al. | |
| 3,272,310 A | * | 9/1966 | Blickisdorf | B65G 47/1457 198/392 |
| 4,401,203 A | * | 8/1983 | McDonald | B65G 47/1457 198/392 |
| 4,526,269 A | * | 7/1985 | Henderson | B65G 47/1457 198/443 |
| 4,530,632 A | | 7/1985 | Sela | |
| 4,699,261 A | * | 10/1987 | Nesin | B65G 47/256 198/391 |
| 4,705,156 A | * | 11/1987 | Boling | B65G 47/1457 198/392 |
| 4,709,798 A | * | 12/1987 | Herzog | B65G 47/1407 198/380 |
| 4,884,678 A | * | 12/1989 | Graham | B65G 47/1464 198/392 |
| 4,938,082 A | * | 7/1990 | Buckley | B07C 5/02 198/392 |

(Continued)

*Primary Examiner* — Joseph A Dillon, Jr.
(74) *Attorney, Agent, or Firm* — Ritchison Law Offices. PC; John D Ritchison

(57) ABSTRACT

A compact and cleanable food grade feeder device and system for quickly orienting, aligning, and feeding single rolls, sandwiches, odd shaped edibles and foodstuff in order to assemble and make ready for packaging the foodstuff. The feeder device and system includes a centrifugal feeder bowl with a food grade ABS plastic, stainless steel or equal durable material cone cap and a rigid disk base plate, a group of selection and flip, separate channels for good food and return food, a movable support structure with wheels, and a system to drive the conveyor(s) wherein the food grade feeder device and system organizes and aligns a foodstuff so that the organized foodstuff items can be transferred to other machinery or humans to further process and package the items.

5 Claims, 9 Drawing Sheets

(56) References Cited

U.S. PATENT DOCUMENTS

| | | | |
|---|---|---|---|
| 5,044,487 A | 9/1991 | Spatafora et al. | |
| 5,101,716 A | 4/1992 | Cones, Sr. et al. | |
| 5,299,675 A | 4/1994 | Schumann et al. | |
| 5,540,943 A | 7/1996 | Naramura | |
| 5,634,551 A | 6/1997 | Francioni et al. | |
| 5,740,899 A * | 4/1998 | Pugh | B65G 47/1457 198/392 |
| 5,853,077 A * | 12/1998 | Schmitt | B65B 35/10 198/383 |
| 5,853,078 A * | 12/1998 | Kneubuhler | B65G 47/1421 198/391 |
| 5,954,184 A * | 9/1999 | Schmitt | B65G 47/256 198/392 |
| 5,954,185 A * | 9/1999 | Eshelman | B65G 47/1464 198/395 |
| 6,216,845 B1 * | 4/2001 | Polese | A46D 3/08 198/392 |
| 6,237,741 B1 | 5/2001 | Guidetti | |
| 6,311,825 B1 * | 11/2001 | Schmitt | B65G 47/1457 198/392 |
| 7,228,953 B2 | 6/2007 | Perreault et al. | |
| 7,258,222 B2 * | 8/2007 | Marti Sala | B65G 47/1464 198/393 |
| 7,383,937 B2 | 6/2008 | Perreault et al. | |
| 8,978,869 B2 * | 3/2015 | Schombert | B65G 47/1464 198/392 |
| 9,532,575 B1 | 1/2017 | Donisi et al. | |
| 10,150,624 B2 * | 12/2018 | Doudement | B65G 47/256 |
| 10,351,352 B2 * | 7/2019 | Doudement | B65G 47/1464 |
| 10,479,539 B2 * | 11/2019 | Schombert | B65G 47/1464 |
| 2003/0121832 A1 * | 7/2003 | Asada | B65G 47/1457 209/1 |
| 2003/0221936 A1 * | 12/2003 | Aoyama | B65G 47/1421 198/395 |
| 2005/0178082 A1 * | 8/2005 | Milot | B65G 47/1464 52/749.13 |
| 2006/0090426 A1 * | 5/2006 | Sakamoto | B65B 35/56 53/498 |
| 2006/0182610 A1 * | 8/2006 | Sala | B65G 47/1464 414/757 |
| 2006/0243560 A1 * | 11/2006 | Perreault | B65G 47/29 198/392 |
| 2006/0243561 A1 * | 11/2006 | Perreault | B65G 47/1464 198/392 |
| 2008/0264968 A1 * | 10/2008 | Jurs | B65G 47/1457 221/289 |
| 2009/0308714 A1 * | 12/2009 | Charpentier | B65G 47/1464 198/392 |
| 2010/0314216 A1 * | 12/2010 | Lanfranchi | B65G 47/1457 198/392 |
| 2014/0069773 A1 * | 3/2014 | Herzog | B65G 47/24 198/382 |
| 2014/0238818 A1 * | 8/2014 | Schombert | B65G 47/1457 198/340 |
| 2015/0375944 A1 * | 12/2015 | Jacobsen | B65G 47/1464 198/445 |
| 2016/0251163 A1 * | 9/2016 | Poulin | B65G 15/62 198/840 |
| 2017/0203926 A1 * | 7/2017 | Landolt | A21C 15/00 |
| 2017/0273869 A9 * | 9/2017 | Yuyama | B65G 47/1457 |
| 2018/0079599 A1 * | 3/2018 | Doudement | B65G 47/256 |
| 2018/0086570 A1 * | 3/2018 | Doudement | B29C 49/4205 |
| 2018/0305053 A1 * | 10/2018 | Schombert | B65B 35/26 |
| 2019/0193270 A1 * | 6/2019 | Charbonnet | B65G 47/1421 |
| 2019/0344969 A1 * | 11/2019 | Anvik | G07F 7/0609 |

* cited by examiner

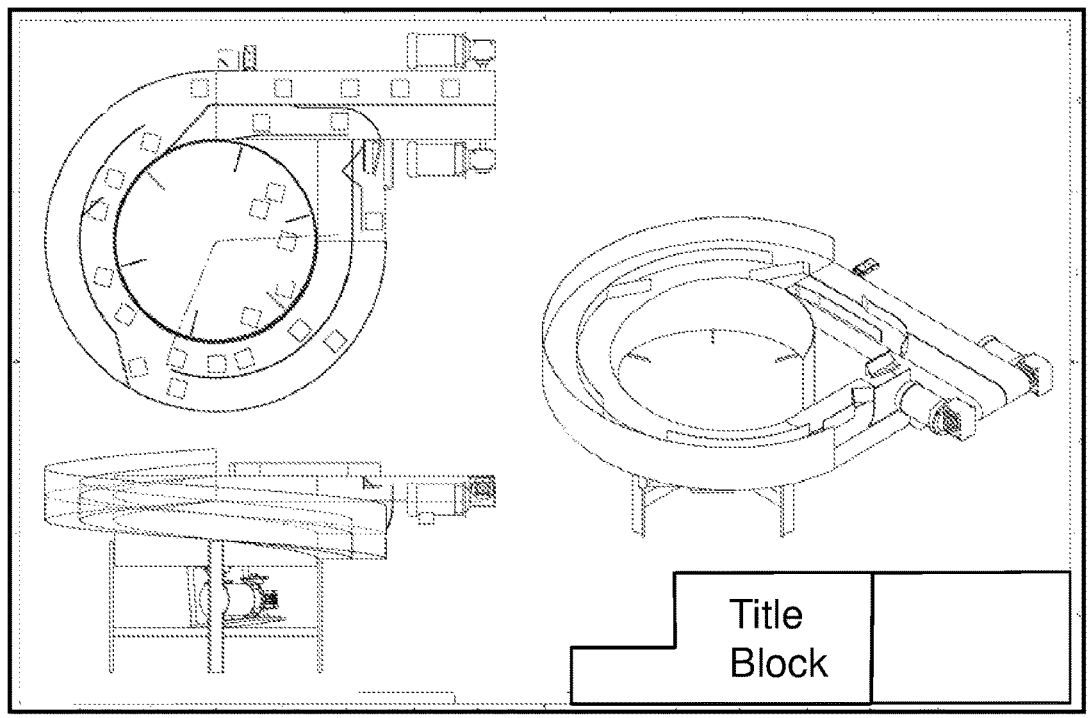
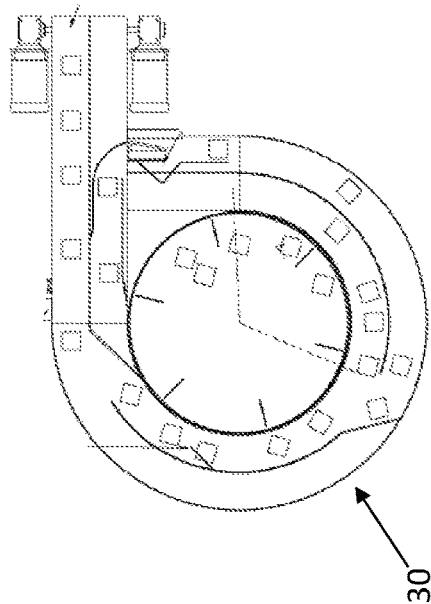
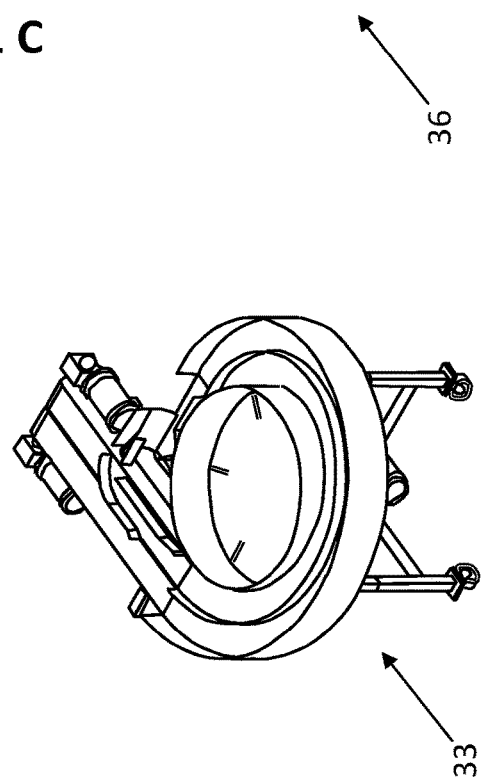
Fig. 1 C
Fig. 1 A
Fig. 1 B

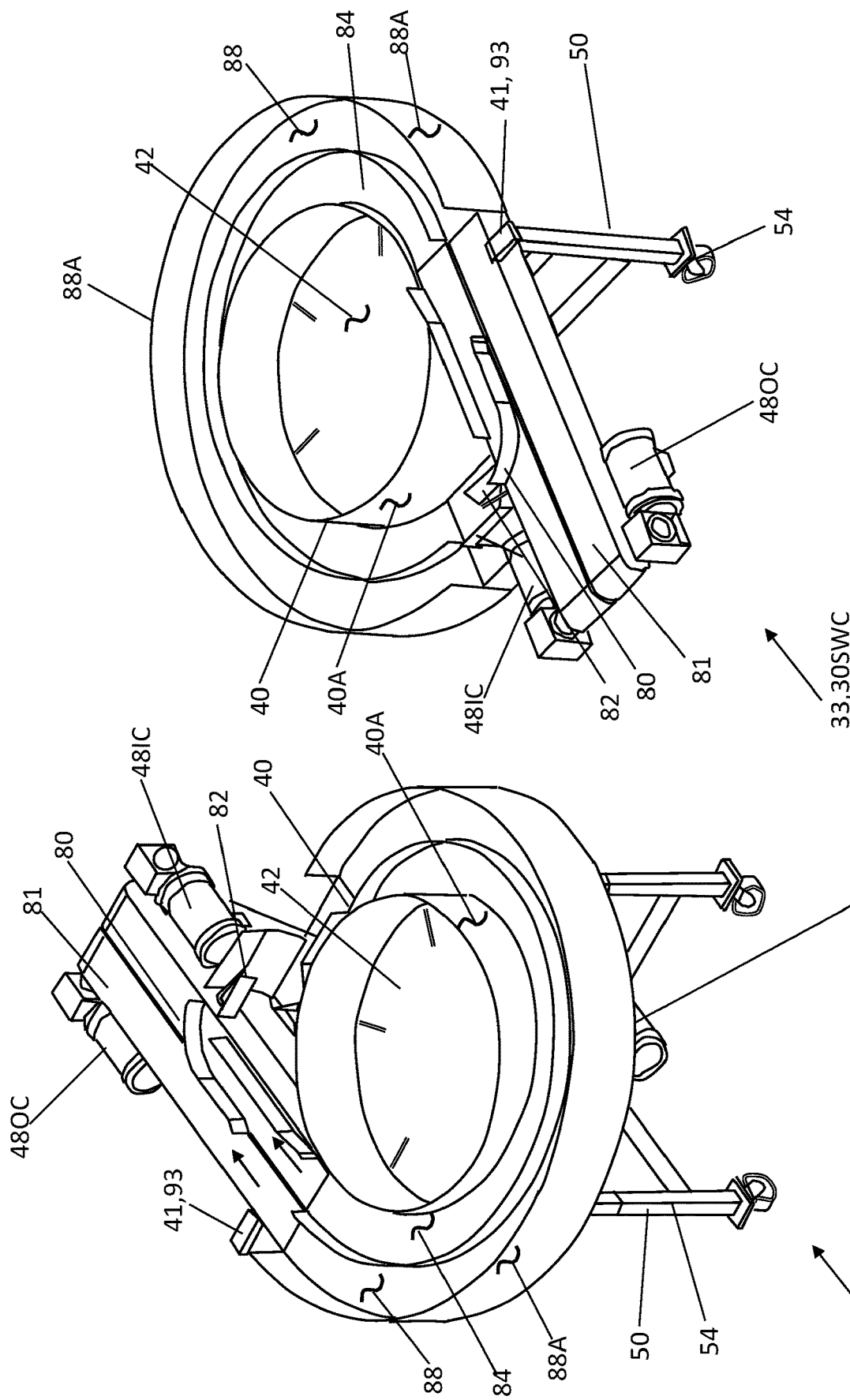

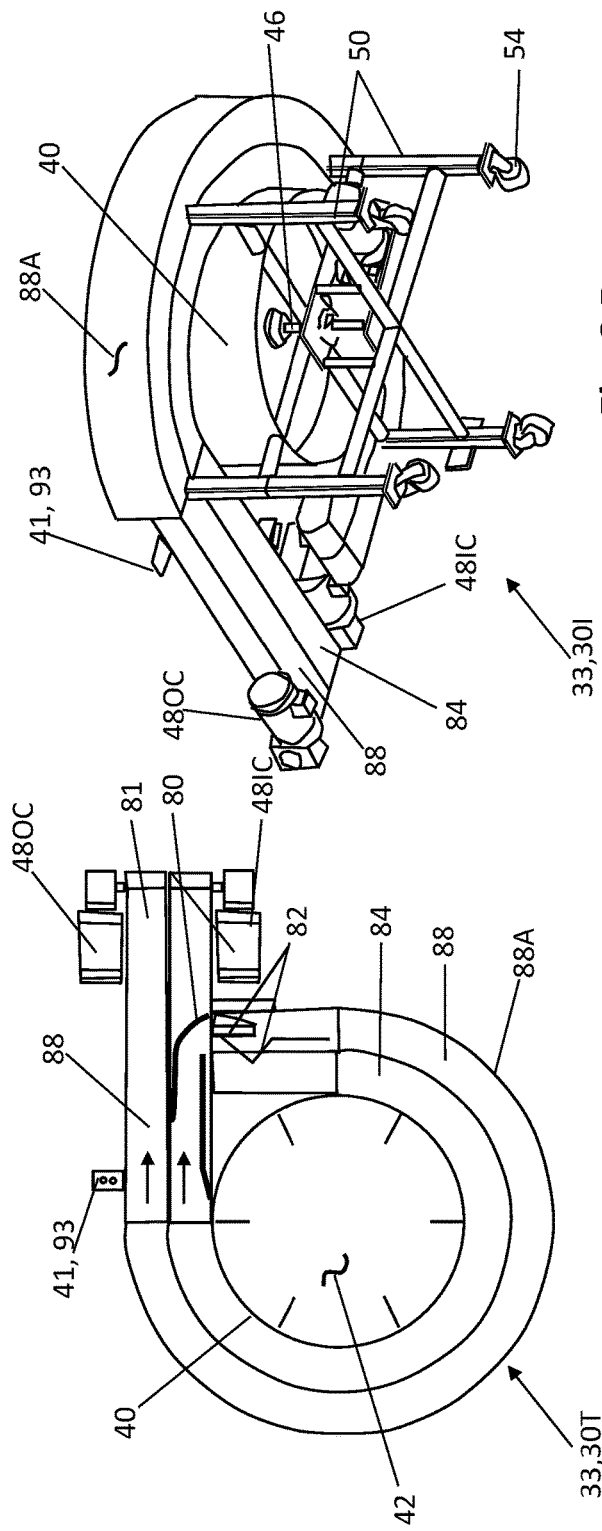
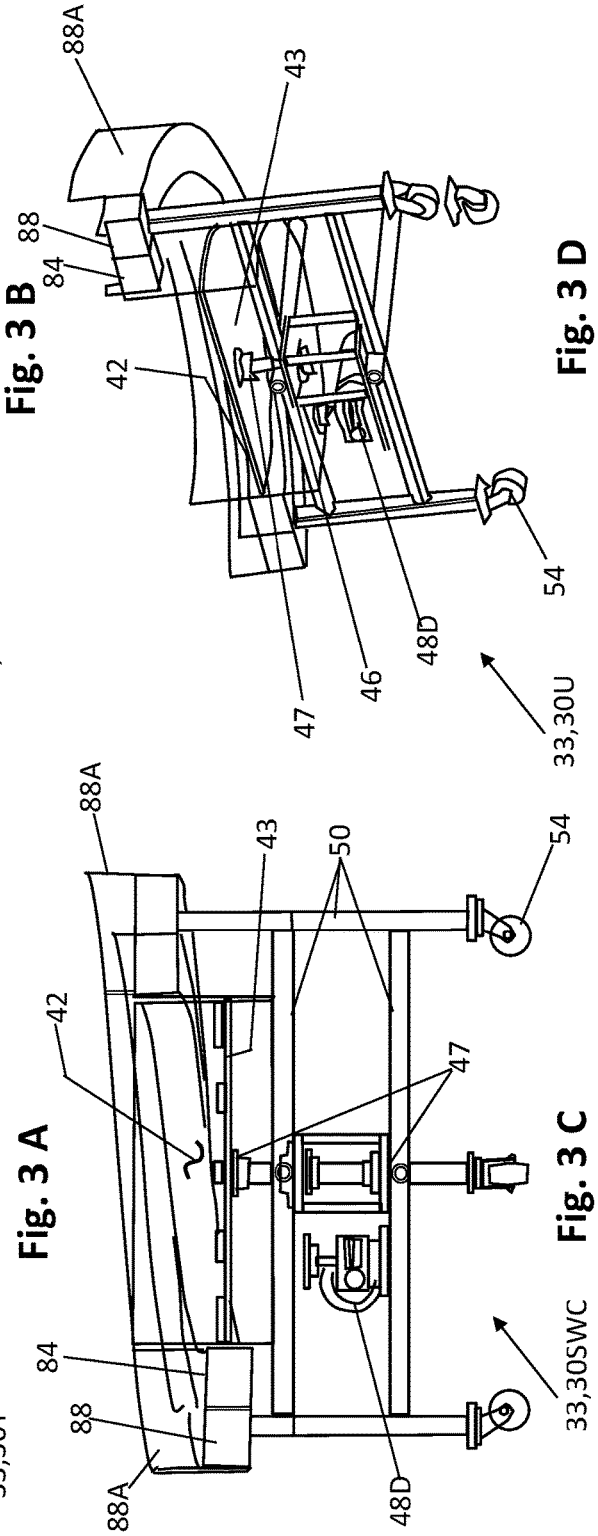
Fig. 3A  Fig. 3B  Fig. 3C  Fig. 3D

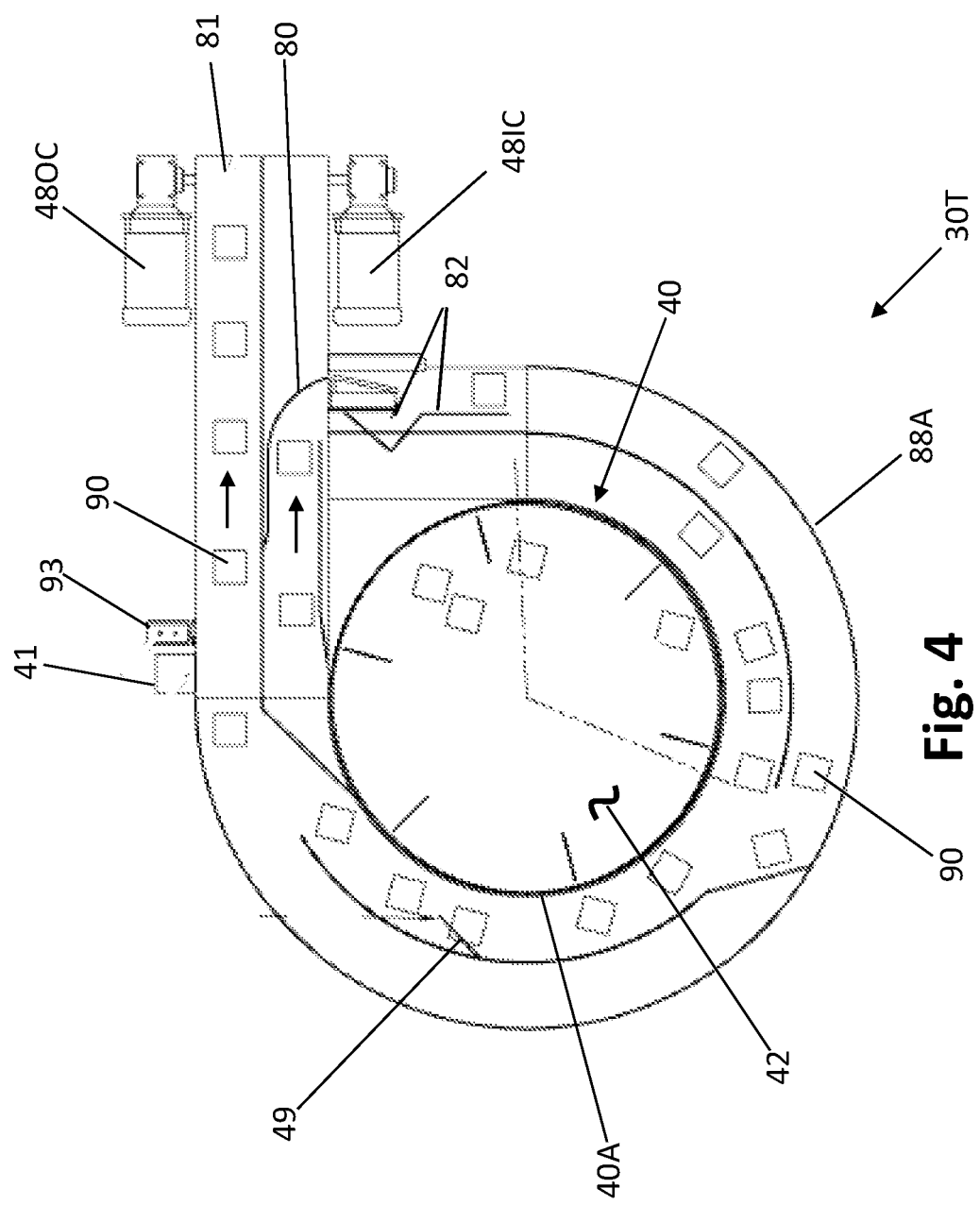

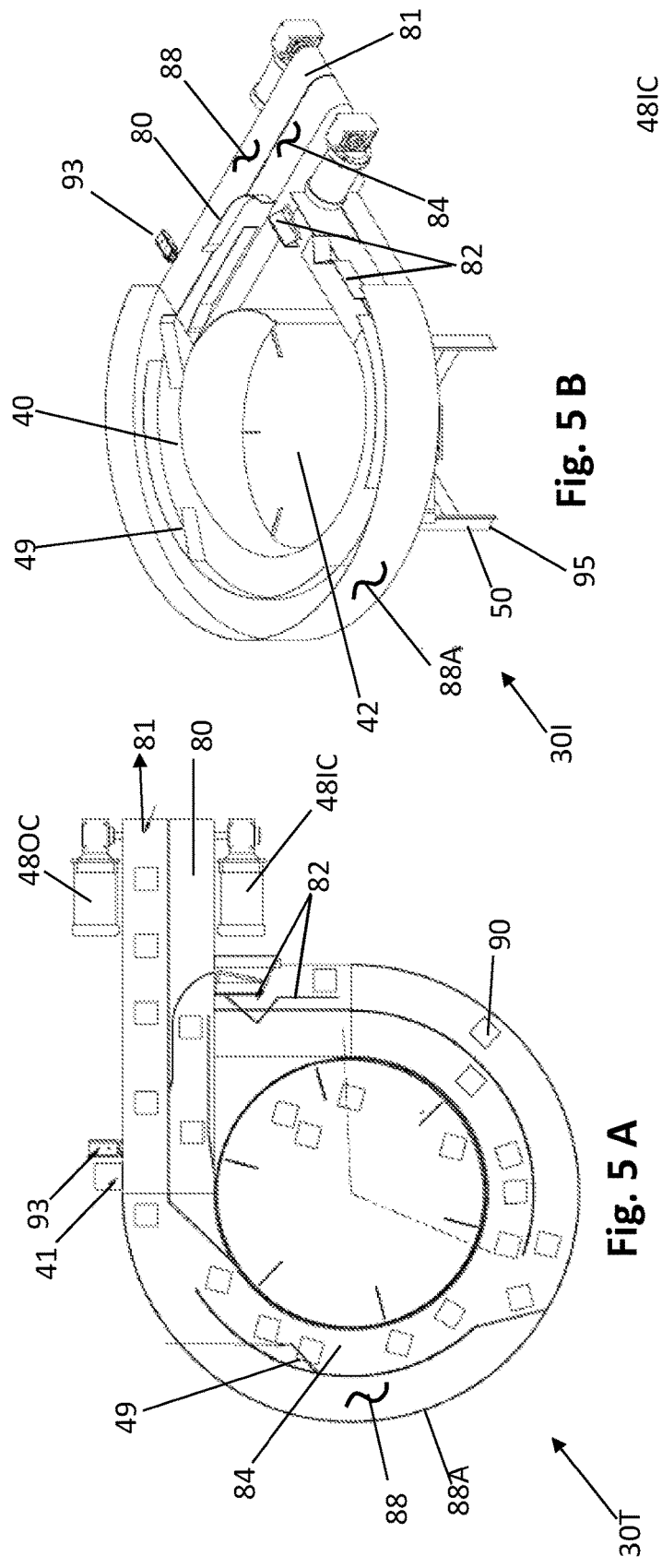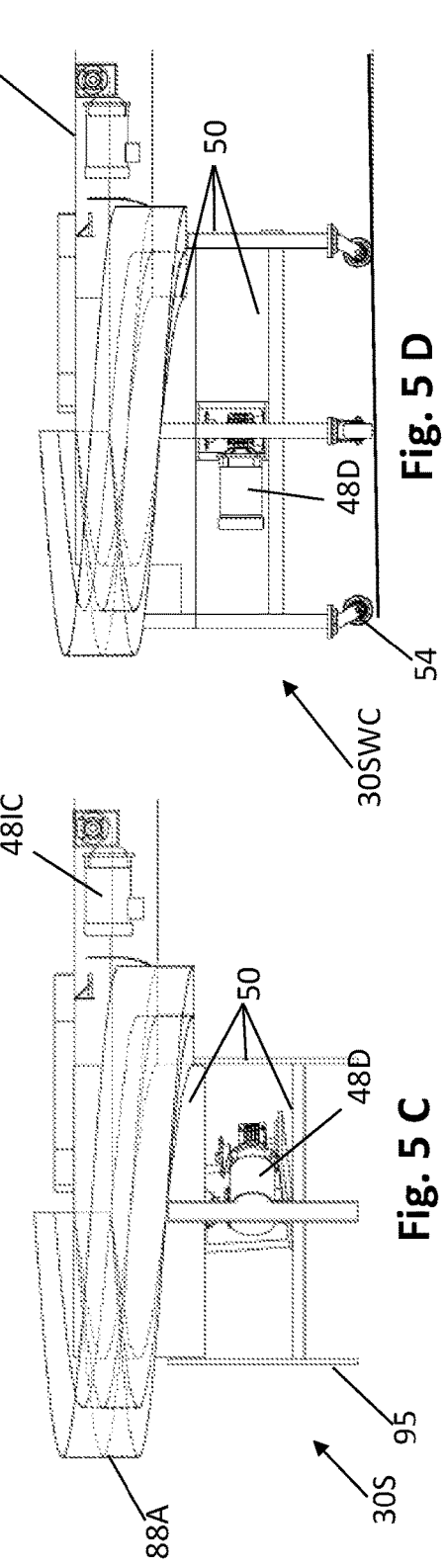

FOOD GRADE FEEDER DEVICE AND SYSTEM FOR ROLLS, SANDWICHES, ODD SHAPED EDIBLES AND FOODSTUFF

CROSS-REFERENCE TO RELATED APPLICATIONS

This application claims the benefit of United States Provisional Patent Application with Ser. No. 62/660,846 Apr. 20, 2018, by Greg Schombert and entitled "Food grade feeder device and system for rolls, sandwiches, odd shaped edibles and foodstuff".

FIELD OF INVENTION

This invention relates to a food grade feeder device and system for rolls, sandwiches, odd shaped edibles and foodstuff. The present disclosure relates generally to the preparation of food products and, more particularly, but not by way of limitation, to preparing sandwiches. It also relates to a sandwich preparation apparatus or food handling system that incorporates a system that automates the process. The present invention relates to a clean product aligning device. This invention relates to an apparatus for the assembling of biscuit or roll sandwiches. More particularly, it relates to an apparatus for the faster, more compact assembling of biscuit sandwiches ready for packaging by a centrifugal feeder bowl. Also, because of its food-grade materials, it relates to a large capacity centrifugal precision feeder which can be utilized to aid in packaging, for instance, food, medical, pharmaceutical and military special handling products.

FEDERALLY SPONSORED RESEARCH

None.

SEQUENCE LISTING OR PROGRAM

None.

BACKGROUND—FIELD OF INVENTION AND PRIOR ART

This section is not Applicable to Provisional Applications. However, as far as known, there are no food grade feeder device and system for rolls, sandwiches, odd shaped edibles and foodstuff or the like. It is believed that this product is unique in its design and technologies.

BACKGROUND

This background as to food machinery for fast processing should be useful. A significant portion of the cost of manufacturing certain food products results from the labor cost in handling such products during manufacturing and/or packaging. Conventional hamburgers have a meat patty in a bun along with various condiments and sauces. A variety of other types of hamburgers and sandwiches have recently become popular and are in high demand at food outlets. These include, for example, such items as the teriyaki burger (adding teriyaki sauce to a conventional hamburger), bacon and lettuce burgers, cheeseburgers with different types of cheeses, barbecue sauce burgers, fish sandwiches, chicken sandwiches, and roast beef sandwiches. New types and kinds of products are being introduced regularly. The words "hamburger" and "sandwich" are interchangeably used in this specification unless otherwise specified. One sees that a demand for increased productivity has arisen as a result of an increase in the number of consumers and increasingly diversified tastes.

Most of the food preparation has been manually performed. Each section for the preparation is independent of the others. Conventional kitchen productivity has been examined, analyzed, and improved many times, and it is difficult to make more improvements. An automated hamburger fixing apparatus has been developed to increase efficiency and reduce the required manual labor. Some of the apparatuses use a feeding and adding mechanism for each different element, condiment or sauce. The application of this apparatus is very limited due to the large/long footprint and amount of space required for the feeding and adding of multiple mechanisms. Changes are unwieldy due to the need to add another feeding and adding mechanism every time a new sauce or condiment is added to the menu. In addition, the control system of the machine has to be modified every time a change for feeding another condiment is made. Further, it is impossible to install such a long and complex apparatus in a small conventional kitchen or even a larger food preparation areas.

In some other industries, various parts or products are placed into packets or pouches for health, sterile, convenience or protective reasons. These are then placed in large quantity boxes or other containers for ultimate delivery to the consumer or customer. Currently, placement of the food or other packets into the boxes or other shipping containers is done by hand, which is labor intensive and time consuming. Centrifugal precision feeders can be developed to aid in this process but they must be manufactured from a food grade material. The materials or food stuff can be then placed on the flexible, cleanable inner disc and are transferred from the inner disc to sorting mechanism and eventually fed to a next station. The use of a food grade centrifugal feeder system can remove the skewed orientation which traditionally has prevented rapid packaging of the material or the packages before they are placed in the shipping containers. Necessarily, equipment is needed for the efficient packaging of the food product. Quite often the equipment must be individually designed and built for the intended food product to be packaged. The equipment must be capable of receiving food in bulk, separating or segregating it to desired serving sizes and packaging it. The equipment must be capable of handling large amounts of the raw food product in a very fast manner so as to work efficiently and competitively with manual packaging operations. One food product in particular which is becoming more popular in package form are sandwiches. Hamburger and sausage sandwiches are quite common; however, they typically are not assembled by the food processor and packaged as a complete product ready for consumption. One reason for this is the lack of equipment to efficiently handle bread, buns or biscuits and combine them with a pre-cooked meat patty or fillet in sandwich form.

Problem Solved

What is desired therefore is an apparatus with a compact footprint, the apparatus being capable of automating at least part of the sandwich-making process in a consistent, reliable manner. Also desired is a method for making sandwiches using a combination of automatic and manual means. Indeed, a combination of characteristics has been found advantageous in providing the desired apparatus and/or method for making sandwiches.

The improvement and problem solved as to a fast and efficient manner for food processing is accomplished by the food grade feeder device and system for rolls, sandwiches, odd shaped edibles and foodstuff. The invented centrifugal feeder with food grade components is a fast, precise, clean and compact way to align and position food products such as rolls, mead, produce and garnishments in way to reduce time and labor as well as fit into small locations. The invention overcomes a long sought need of the food preparation industry that feeds millions at fast food restaurants, convenient marts, coffee houses and other "food on the go" companies.

PRIOR ART

A novelty search was completed for the food grade feeder device and system for rolls, sandwiches, odd shaped edibles and foodstuff. It revealed the following:

A. U.S. Pat. No. 9,532,575 by Donis, et al. issued in 2017 is for an automated sandwich assembly unit. An automatic sandwich maker designed to automate the process of preparing sandwiches, including hamburgers, is included. This automated sandwich maker is designed for use in commercial kitchens, including small commercial kitchens, such as fast-food kitchens. The apparatus and method for automatically making sandwiches overcomes the drawbacks and limitations of the prior art. The individual sandwich process can be controlled by communications interface with a point of sales system. The inventive apparatus and method reduces manpower requirements for restaurants, provides enhanced ingredient control, and improves overall product quality.

B. U.S. Pat. No. 7,383,937 by Perreault, et al. issued in 2008 is for an Article feeder and spacer. A feeder for orienting and aligning disorderly incoming items includes a rotatable table having a peripheral wall and a discharge opening in the peripheral wall, the discharge opening allowing the items in a predetermined orientation to be successively withdrawn from the rotatable table in a single file line, the rotatable table being fed with disorderly items; a first carrier disposed proximate to the discharge opening, the first carrier recovering the oriented items exiting through the discharge opening; and an item spacer mounted proximate to the first carrier, the item spacer providing a predetermined spacing between two consecutive oriented items. It also relates to a method for doing same.

C. U.S. Pat. No. 7,228,953 by Perreault, et al. issued in 2007 is for an Article feeder and spacer. A feeder for orienting and aligning disorderly incoming articles includes a table having a peripheral wall, a rotary surface surrounded by the peripheral wall, and a discharge substantially tangential to the peripheral wall, the discharge being sized to receive one article at a time from the rotary surface in a predetermined orientation; and at least one pile eliminating member extending above the rotary surface and defining a gap with the rotary surface, the gap being sized to solely permit passage of non-superposed articles laying in the predetermined orientation on the rotary surface. It also relates to a method for doing same and a method and an apparatus for removing obstructing blocks from the discharge.

D. U.S. Pat. No. 6,237,741 by Guidetti issued in 2001 is for a Process for controlling the operation of machines for processing articles, for example for packaging food products, and the machine thereof. A process for controlling the operation of machines for processing articles includes the step of synchronously controlling the movement or speed of a feeding device and an intake branch of the machine. The process provides a method of adapting a processing machine to adjust to discontinuities in an otherwise continuous flow of articles being supplied to the machine for processing. The process provides for the speed of the feeding device and the speed of the intake branch to both be reduced simultaneously. The speed of the feeding device is slowed sufficiently that it obtains a minimum speed at the time that the perceived discontinuity reaches the interface of the feeding device and the intake branch. Simultaneously, the speed of the intake branch is reduced to a substantially standstill condition at the time that the feeding device obtains its minimum speed. The process may further provide for the standstill condition of the intake branch to be maintained until the first article, positioned after the detected discontinuity, reaches the intake branch. The process may then provide for the reactivation of the intake branch so as to bring the feeding device and the intake branch back to their normal operating conditions.

E. U.S. Pat. No. 5,634,551 by Francioni, et al. issued in 1997 is for a Method and apparatus for regulating the advancing movement of articles, for example in installations for the automatic packaging of food products. A device for regulating the advancing movement of articles in a given direction comprises a plurality of conveyors, such as for example belt conveyors, between an input supply conveyor and a positive drive output conveyor operating to supply, for example, a packaging machine. In order to adapt automatically to the handling of articles with different lengths, at least some of the aforesaid conveyors, intended to perform a phasing action of the advancing movement of the articles, are chosen with different lengths so as to form a set which is able to deal with the possible range of variation in the length of the articles dealt with, by coupling several conveyors in cascade. Preferably, the conveyor at the downstream end has a selectively controllable length varied in dependence on the length of the articles being handled.

F. U.S. Pat. No. 5,540,943 by Naramura issued in 1996 is for a Sandwich preparation apparatus. A sandwich preparation apparatus includes a food material conveyor having an upstream end region and a downstream finishing end region. The bottom part of a sandwich or burger, including a bun half or slice of bread, has sauces and condiments, and a patty if necessary, automatically added by a first automatic fixing section in the upstream end region. The upper part of the sandwich, optionally including additional sauces, condiments, and patties, is completed by a second automatic fixing section in the downstream finishing end region. Between the two regions is a manual fixing section for an operator to manually add various food materials to the sandwich. The operator controls the automatic fixing sections through first and second input devices and an order display device. The operator is able to change the order or sequence of sandwiches between the upstream end region and the downstream end region using the second input device. The operator is thus able to make allowances for different cooking or preparation times for different types of sandwiches.

G. U.S. Pat. No. 5,299,675 by Schumann, et al. issued in 1994 is for a Pouch feeder method and device with angled rim. A precision feeding device for soft and hard packaged articles includes an angled rim for improved feeding and alignment. Separated rollers are placed between a rigid plate and a flexible disc to further enhance the operation and durability of the device.

H. U.S. Pat. No. 5,101,716 by Cones, Sr. et al. issued in 1992 is for an Apparatus for assembling biscuit sandwiches. An apparatus for the assembly of biscuit and meat sandwiches comprises a feeder station for receiving whole biscuits, a slicer station for slicing the biscuits in half, a separator station for separating the two halves of the biscuit and sending them along separate pathways, and an assembly station having a hold station where precooked meat patties are held and where the biscuit halves and the meat patties are assembled into a sandwich ready for packaging. A series of conveyors transport the food components between the stations.

I. U.S. Pat. No. 5,044,487 by Spatafora, et al. issued in 1991 is for a Product aligning device, particularly for supplying wrapping machines. A device for aligning products, wherein an annular body turning about its axis presents an annular end surface defining a first route for the product items arranged in line, and an inner lateral surface defining, with the upper surface of a flat disc turning about its axis and on to which the product is fed in bulk, a second annular route for the product; the annular body being inclined in relation to the disc; so as to define a first junction between the first and second route, and a second junction between the first route and a third route defined by an output conveyor tangent to the annular body; the disc being fed in bulk with the product items, which are fed, by centrifugal force, on to the second route and then, one by one, on to the first route via the first junction and on to the third route via the second junction.

J. U.S. Pat. No. 4,530,632 by Sela issued in 1985 is for a Stacking apparatus for flexible, generally planar food products. An apparatus for counting and stacking food products such as tortillas. The tortillas are initially placed on an entry chute containing a large number of air outlets for creating a cushion of air to allow the tortilla to slide down the entry chute onto an incline conveyor belt. The conveyor belt is of an open mesh design and it is supported on a belt support having a large number of air inlets which create a vacuum that maintains the tortilla in contact with the belt. The tortillas are carried by the belt down one end of the belt support and along the underside of the belt support with contact between the tortilla and belt being maintained by vacuum creating air inlets formed in the belt support. The air inlets terminate at a location on the underside of the belt support thereby allowing the tortillas to drop from the conveyor belt. The tortillas drop onto a stationary rack formed by rods which are interleaved with conveyor belts moving together as a unit. The conveyor belts are normally positioned beneath the upper surface of the rack. However, when a predetermined number of tortillas have been stacked, the belt is lifted thereby carrying the tortillas from the rack. The mechanism for lifting the belts is actuated by a counter which counts a predetermined number of tortillas passing past a counting station and delays actuating the belt lifting mechanism until the final tortilla has dropped onto the rack. The belts discharging the stacks of tortillas move in the direction opposite the direction that the tortillas are delivered to the rack in order to minimize the time required to remove the tortillas. And, K. U.S. Pat. No. 3,224,554 by J. E. Mouldert et. al. issued in 1965 is for an Automatic Orientation, Alignment and input feeding machinery for confectionary articles. This invention relates to automatic systems for handling large masses of confectionary articles and in particular to automatic input feeding machinery for lining up and feeding confectionary articles in predetermined orientation into apparatus for further operations to be performed upon them. The automatic input machinery described herein as illustrative of the invention is particularly adapted for receiving a large group or bulk of freshly made non-circular confections in random orientation and for gently sorting out this large mass of the confections and for feeding them along a line into positions and at a proper supply rate and in predetermined orientation for further operations on the confections, while avoiding any damage or marring of the freshly made product.

As can be observed, none of the prior art has anticipated or caused one skilled in the food processing and preparation art to see this new invention as obvious to one skilled in the industry. The food grade feeder device and system for rolls, sandwiches, odd shaped edibles and foodstuff provides an answer to a clean, compact and fast manner to organized, align and singularly foodstuffs such as rolls, buns, meats and other food in a compact and efficient manner.

SUMMARY OF THE INVENTION

This invention is a food grade feeder device and system for rolls, sandwiches, odd shaped edibles and foodstuff. Taught here are the ways that food preparation can be clean, fast, compact and efficient. The newly invented feeder device has various applications.

The preferred embodiment of the food grade feeder device and system for rolls, sandwiches, odd shaped edibles and foodstuff is comprised of: (a) a centrifugal feeder bowl with a food grade ABS plastic, stainless steel, food grade composite materials, or equal durable material cone cap and a rigid disk base plate; (b) a group of selection devices such as a selection sensor, a height qualifier plate, a flip device, a return channel and a good food channel; (c) a support structure with wheels; (d) an electrical drive motor and gear box to rotationally turn/spin the centrifugal base plate with a feeder vertical drive shaft and at least two bearings for rotationally securing drive shaft to feeder support structure; and (e) an internal and external conveyors, each with a drive system (motor, gearbox, driven sprockets/pulleys and shaft for each conveyor) wherein the food grade feeder device and system organizes and aligns a foodstuff item such as rolls, sandwiches, odd shaped edibles, and other materials so that the organized foodstuff items can be transferred to other machinery or humans to further process and package the items.

Objects and Advantages

There are several objects and advantages of the food grade feeder device and system for rolls, sandwiches, odd shaped edibles and foodstuff. These various advantages and benefits include:

| Item | Advantages |
|------|-----------|
| 1 | Food grade surface for equipment |
| 2 | On wheels to permit portability and fat installation |
| 3 | Washable and resistant to steam |
| 4 | Compact footprint for less use of floor space |
| 5 | Versatile designs for use with various foodstuffs - can be easily changed to handle different shapes and styles of foodstuffs |
| 6 | Uses sort and feed components in a new combination |
| 7 | Easy to maintain |

Finally, other advantages and additional features of the present food grade feeder device and system for rolls, sandwiches, odd shaped edibles and foodstuff will be more apparent from the accompanying drawings and from the full description of the device. For one skilled in the art of fast food preparation and food preparation, it is readily understood that the features shown in the examples with this product are readily adapted to other types of compact and fast food processing equipment and tools.

DESCRIPTION OF THE DRAWINGS—FIGURES

The accompanying drawings, which are incorporated in and constitute a part of this specification, illustrate an embodiment of the food grade feeder device and system for rolls, sandwiches, odd shaped edibles and foodstuff that is preferred. The drawings together with the summary description given above and a detailed description given below serve to explain the principles of the food grade feeding device. It is understood, however, that the feeding device and system is not limited to only the precise arrangements and instrumentalities shown.

FIGS. 1A through 1C are sketches of the general food grade feeder device and system for rolls, sandwiches, odd shaped edibles and foodstuff, a prototype sketch of the food grade feeder device, and a design drawing of the food grade feeder device and system.

FIGS. 2A and 2B are sketches of the general prototype of the food grade feeder device and system for rolls, sandwiches, odd shaped edibles and foodstuff from a front and rear view, with components and features noted.

FIGS. 3A through 3D are sketches of the general prototype of the food grade feeder device and system for rolls, sandwiches, odd shaped edibles and foodstuff from a top and an underneath view and sections of the side and underneath views, with components and features noted.

FIG. 4 is a top sketch of the food grade feeder device and system for rolls, sandwiches, odd shaped edibles and foodstuff, with components and features noted.

FIG. 5A through 5D are sketches of the food grade feeder device and system for rolls, sandwiches, odd shaped edibles and foodstuff, from generally a top, isometric, full side without wheels, and full side with wheels views with components and features noted.

Figure 6:
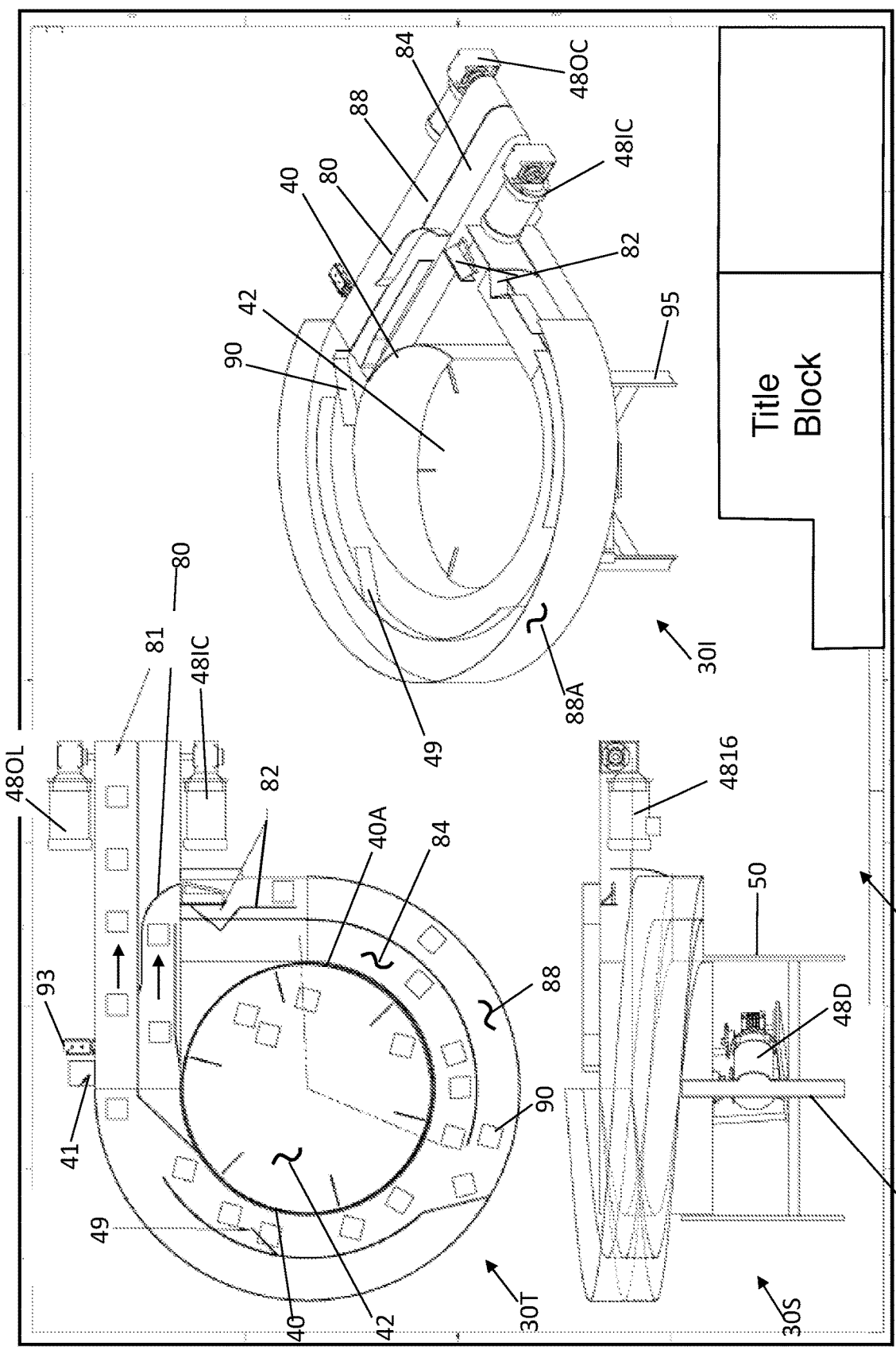
FIG. 6 is a design drawing of the food grade feeder device and system for rolls, sandwiches, odd shaped edibles and foodstuff.

FIG. 8A through 8E a single conveyor version of feeder for items that only need singulated (fed one at a time).

FIG. 9A through 9D are sketches of prior art.

DESCRIPTION OF THE DRAWINGS—REFERENCE NUMERALS

The following list refers to the drawings:

TABLE B

Reference numbers

| Ref # | Description |
|-------|-------------|
| 30 | food grade feeder device and system 30 for rolls, sandwiches, odd shaped edibles and foodstuff |
| 30T | top view 30T of the food grade feeder device and system 30 |
| 30I | isometric view 30I of the food grade feeder device and system 30 |
| 30S | side view 30S of the food grade feeder device and system 30 |
| 30SWC | side view with wheels 30S of the food grade feeder device and system 30 |
| 30U | underneath view 30U of the food grade feeder device and system 30 |
| 31 | single conveyor system 31 of the food grade feeder device and system 30 with singulation or separate and feed one part at a time |
| 33 | prototype sketches 33 of the food grade feeder device and system for rolls, sandwiches, odd shaped edibles and foodstuff 30 |
| 35 | construction details 35 |
| 36 | design drawing 36 of the food grade feeder device and system 30 for rolls, sandwiches, odd shaped edibles and foodstuff |
| 37 | design drawing 37 with operation and material notes for the food grade feeder device and system 30 for rolls, sandwiches, odd shaped edibles and foodstuff |
| 38 | operation details 38 |
| 39 | material details 39 |
| 40 | centrifugal feeder bowl 40 |
| 40A | exterior surface 40A of feeder bowl 40 |
| 41 | selection sensor 41 |
| 42 | food grade ABS plastic, stainless steel, food grade composite materials, or equal durable material cone cap 42 |
| 43 | rigid disk base plate 43 (bottom of cone 42) |
| 46 | feeder vertical drive shaft 46 |
| 47 | at least two bearings 47 for rotationally securing drive shaft 46 to feeder support structure 50 |
| 48IC | drive system 48IC - motor, gearbox, driven sprockets/pulleys and shaft for inside conveyor |
| 48OC | drive system 48OC - motor, gearbox, driven sprockets/pulleys and shaft for outside conveyor |
| 48D | drive system 48D - motor, gearbox, chain/belts between drive and driven sprockets/pulleys between motor 48D and shaft 46 to ultimately turn the centrifugal base plate 43 |
| 49 | height qualifier 49 shaft, plate, or equal |
| 50 | support structure 50 under the food grade feeder device and conveyors |
| 54 | wheels or castors 54 at the floor of the structure 50 legs |
| 70 | electrical power and control panel 70 (not shown) |
| 71 | feeder operator control box 71 (not shown) |
| 80 | return channel 80 |
| 81 | good food channel 81 |
| 82 | flip device 82 |
| 84 | inside conveyor 84 |
| 88 | outside conveyor 88 |
| 88A | outside surface 88A of outside conveyor 88 |
| 90 | foodstuff and rolls 90 being oriented and fed through the food grade feeder device and system 30 |
| 93 | selection tooling (orientation and quantity) and zone 93 |
| 95 | support plate pads/feet 95 |

TABLE B-continued

Reference numbers

| Ref # | Description |
|---|---|
| 100 | prior art 100 U.S. Pat. No. 5,299,675 by Schumann, et al. issued in 1994 is for a Pouch feeder method and device with angled rim. |
| 101 | prior art 101 U.S. Pat. No. 5,540,943 by Naramura issued in 1996 is for a Sandwich preparation apparatus. |
| 102 | prior art 102 H. U.S. Pat. No. 5,101,716 by Cones, Sr. et al. issued in 1992 is for an Apparatus for assembling biscuit sandwiches. |
| 103 | prior art 103 U.S. Pat. No. 9,532,575 by Donis, et al. issued in 2017 is for an Automated sandwich assembly unit. |

DETAILED DESCRIPTION OF PREFERRED EMBODIMENT

This invention relates to a food grade feeder device and system for rolls, sandwiches, odd shaped edibles and foodstuff. The present disclosure relates generally to the preparation of food products and, more particularly, but not by way of limitation, to preparing sandwiches. It also relates to a sandwich preparation apparatus or food handling system that incorporates a system that automates the process. The present invention relates to a clean product aligning device. This invention relates to an apparatus for the assembling of biscuit or roll sandwiches. More particularly, it relates to an apparatus for the faster, more compact assembling of biscuit sandwiches ready for packaging by a centrifugal feeder bowl. Also, because of its food-grade materials, it relates to a large capacity centrifugal precision feeder which can be utilized to aid in packaging, for instance, food, medical, pharmaceutical and military special handling products.

The advantages for the food grade feeder device and system 30 for rolls, sandwiches, odd shaped edibles and foodstuff are listed above in the introduction. Succinctly the benefits are that the device and system:
  A. Food grade surface for equipment
  B. On wheels to permit portability and fat installation
  C. Washable and resistant to steam
  D. Compact footprint for less use of floor space
  E. Versatile designs for use with various foodstuffs—can be easily changed to handle different shapes and styles of foodstuffs Uses sort and feed components in a new combination
  F. Easy to maintain The preferred embodiment of the food grade feeder device and system for rolls, sandwiches, odd shaped edibles and foodstuff is comprised of: (a) a centrifugal feeder bowl 40 with a food grade ABS plastic, stainless steel, food grade composite materials, or equal durable material cone cap 42 and a rigid disk base plate 43; (b) a group of selection devices such as a selection sensor 41, a height qualifier plate 49, a flip and ramp device 82, a return channel 80 and a good food channel 81; (c) a support structure 50 with wheels 54; (d) an electrical drive motor and gear box 44 to rotationally turn/spin the centrifugal base plate 43 with a feeder vertical drive shaft 46 and at least two bearings 47 for rotationally securing drive shaft 46 to feeder support structure 50; and (e) an internal and external conveyors, each with a drive system (motor, gearbox, driven sprockets/pulleys and shaft for each conveyor) wherein the food grade feeder device and system organizes and aligns a foodstuff item such as rolls, sandwiches, odd shaped edibles, and other materials so that the organized foodstuff items can be transferred to other machinery or humans to further process and package the items.

There is shown in FIGS. 1-9 a complete description and operative embodiment of the food feeder device and system 30. In the drawings and illustrations, one notes well that the FIGS. 1-9 demonstrate the general configuration and use of this product. The various example uses are in the operation and use section, below.

The accompanying drawings, which are incorporated in and constitute a part of this specification, illustrate an embodiment of the food grade feeder device and system 30 for rolls, sandwiches, odd shaped edibles and foodstuff that is preferred. The drawings together with the summary description given above and a detailed description given below serve to explain the principles of the food feeder device and system 30. It is understood, however, that the device 30 is not limited to only the precise arrangements and instrumentalities shown. Other examples of food feeding machines and systems and their uses are still understood by one skilled in the art of food feeding equipment and devices to be within the scope and spirit shown here.

FIGS. 1 A through 1 C are sketches of the general food grade feeder device and system 30 for rolls, sandwiches, odd shaped edibles and foodstuff, a prototype sketch 33 of the food grade feeder device, and a design drawing 36 of the food grade feeder device and system. Shown in these first views are: a food grade feeder device and system 30 for rolls, sandwiches, odd shaped edibles and foodstuff; a prototype sketches 33 of the food grade feeder device and system for rolls, sandwiches, odd shaped edibles and foodstuff 30; and a a design drawing 36 of the food grade feeder device and system 30 for rolls, sandwiches, odd shaped edibles and foodstuff.

FIGS. 2 A and 2 B are sketches of the general prototype 33 of the food grade feeder device and system for rolls, sandwiches, odd shaped edibles and foodstuff 30 from a front and rear view, with components and features noted. Demonstrated in these sketches are many features and components including: a side view 30S of the food grade feeder device and system 30; a side view with wheels 30SWC of the food grade feeder device and system 30; a prototype sketches 33 of the food grade feeder device and system for rolls, sandwiches, odd shaped edibles and foodstuff 30; a centrifugal feeder bowl 40; an exterior surface 40A of feeder bowl 40; a selection sensor 41; a food grade ABS plastic, stainless steel, food grade composite materials, or equal durable material cone cap 42; a drive system 48IC—motor, gearbox, driven sprockets/pulleys and shaft for inside conveyor; a drive system 48OC—motor, gearbox, driven sprockets/pulleys and shaft for outside conveyor; a support structure 50 under the food grade feeder device and conveyors; a set of wheels or castors 54 at the floor of the structure 50 legs; an electrical power and control panel 70 (not shown); a feeder operator control box 71 (not shown); a return channel 80; a good food channel 81; a flip and ramp device 82; an inside conveyor 84; an outside conveyor 88; and an outside surface 88A of outside conveyor 88.

FIGS. 3 A through 3 D are sketches of the general prototype 33 of the food grade feeder device and system 30 for rolls, sandwiches, odd shaped edibles and foodstuff, from a top and an underneath view and sections of the side and underneath views, with components and features noted. Portrayed here are: a food grade feeder device and system 30 for rolls, sandwiches, odd shaped edibles and foodstuff; a top view 30T of the food grade feeder device and system 30; an isometric view 30I of the food grade feeder device and system 30; a side view with wheels 30SWC of the food grade feeder device and system 30; an underneath view 30U of the food grade feeder device and system 30; a prototype sketches 33 of the food grade feeder device and system for rolls, sandwiches, odd shaped edibles and foodstuff 30; a centrifugal feeder bowl 40; an exterior surface 40A of feeder bowl 40; a selection sensor 41; a food grade ABS plastic, stainless steel, food grade composite materials, or equal durable material cone cap 42; a rigid disk base plate 43 (bottom of cone 42); a feeder vertical drive shaft 46; at least two bearings 47 for rotationally securing drive shaft 46 to feeder support structure 50; a drive system 48IC—motor, gearbox, driven sprockets/pulleys and shaft for inside conveyor; a drive system 48OC—motor, gearbox, driven sprockets/pulleys and shaft for outside conveyor; a drive system 48D—motor, gearbox, chain/belts between drive and driven sprockets/pulleys between motor 48D and shaft 46; a support structure 50 under the food grade feeder device and conveyors; a set of wheels or castors 54 at the floor of the structure 50 legs; an electrical power and control panel 70 (not shown); a feeder operator control box 71 (not shown); a return channel 80; a good food channel 81; a flip and ramp device 82; an inside conveyor 84; an outside conveyor 88; and an outside surface 88A of outside conveyor 88.

FIG. 4 is an enlarged top sketch 30T of the food grade feeder device and system 30 for rolls, sandwiches, odd shaped edibles and foodstuff, with components and features noted. This enlarged view shows the following: a top view 30T of the food grade feeder device and system 30; a centrifugal feeder bowl 40; an exterior surface 40A of feeder bowl 40; a selection sensor 41; a food grade ABS plastic, stainless steel, food grade composite materials, or equal durable material cone cap 42; a drive system 48IC—motor, gearbox, driven sprockets/pulleys and shaft for inside conveyor; a drive system 48OC—motor, gearbox, driven sprockets/pulleys and shaft for outside conveyor; a height qualifier 49 shaft, plate, or equal; a return channel 80; a good food channel 81; a flip and ramp device 82; an inside conveyor 84; an outside conveyor 88; an outside surface 88A of outside conveyor 88; a foodstuff and rolls 90 being oriented and fed through the food grade feeder device and system 30; and a selection tooling (orientation and quantity) and zone 93.

FIG. 5 A through 5 D are sketches of the food grade feeder device and system 30 for rolls, sandwiches, odd shaped edibles and foodstuff, from generally a top, isometric, full side without wheels, and full side with wheels views with components and features noted. These top, isometric and section views demonstrate components and features such as: a top view 30T of the food grade feeder device and system 30; an isometric view 30I of the food grade feeder device and system 30; a side view 30S of the food grade feeder device and system 30; a side view with wheels 30SWC of the food grade feeder device and system 30; an underneath view 30U of the food grade feeder device and system 30; a centrifugal feeder bowl 40; a selection sensor 41; a food grade ABS plastic, stainless steel, food grade composite materials, or equal durable material cone cap 42; a drive system 48IC—motor, gearbox, driven sprockets/pulleys and shaft for inside conveyor; a drive system 48OC—motor, gearbox, driven sprockets/pulleys and shaft for outside conveyor; a drive system 48D—motor, gearbox, chain/belts between drive and driven sprockets/pulleys between motor 48D and shaft 46; a height qualifier 49 shaft, plate, or equal; a support structure 50 under the food grade feeder device and conveyors; a set of wheels or castors 54 at the floor of the structure 50 legs; an electrical power and control panel 70 (not shown); a feeder operator control box 71 (not shown); a return channel 80; a good food channel 81; a flip and ramp device 82; an inside conveyor 84; an outside conveyor 88; an outside surface 88A of outside conveyor 88; a foodstuff and rolls 90 being oriented and fed through the food grade feeder device and system 30; a selection tooling (orientation and quantity) and zone 93; and a set of support plate pads/feet 95 at the end of the legs of support structure 50.

FIG. 6 is a design drawing 36 of the food grade feeder device and system 30 for rolls, sandwiches, odd shaped edibles and foodstuff. These show: a top view 30T of the food grade feeder device and system 30; an isometric view 30I of the food grade feeder device and system 30; a side view 30S of the food grade feeder device and system 30; a design drawing 36 of the food grade feeder device and system 30 for rolls, sandwiches, odd shaped edibles and foodstuff; a centrifugal feeder bowl 40; an exterior surface 40A of feeder bowl 40; a selection sensor 41; a food grade ABS plastic, stainless steel, food grade composite materials, or equal durable material cone cap 42; a drive system 48IC—motor, gearbox, driven sprockets/pulleys and shaft for inside conveyor; a drive system 48OC—motor, gearbox, driven sprockets/pulleys and shaft for outside conveyor; a drive system 48D—motor, gearbox, chain/belts between drive and driven sprockets/pulleys between motor 48D and shaft 46; a height qualifier 49 shaft, plate, or equal; a support structure 50 under the food grade feeder device and conveyors; an electrical power and control panel 70 (not shown); a feeder operator control box 71 (not shown); a return channel 80; a good food channel 81; a flip and ramp device 82; an inside conveyor 84; an outside conveyor 88; an outside surface 88A of outside conveyor 88; a foodstuff and rolls 90 being oriented and fed through the food grade feeder device and system 30; and a set of support plate pads/feet 95 at the end of the legs of structure 50.

Figure 7:
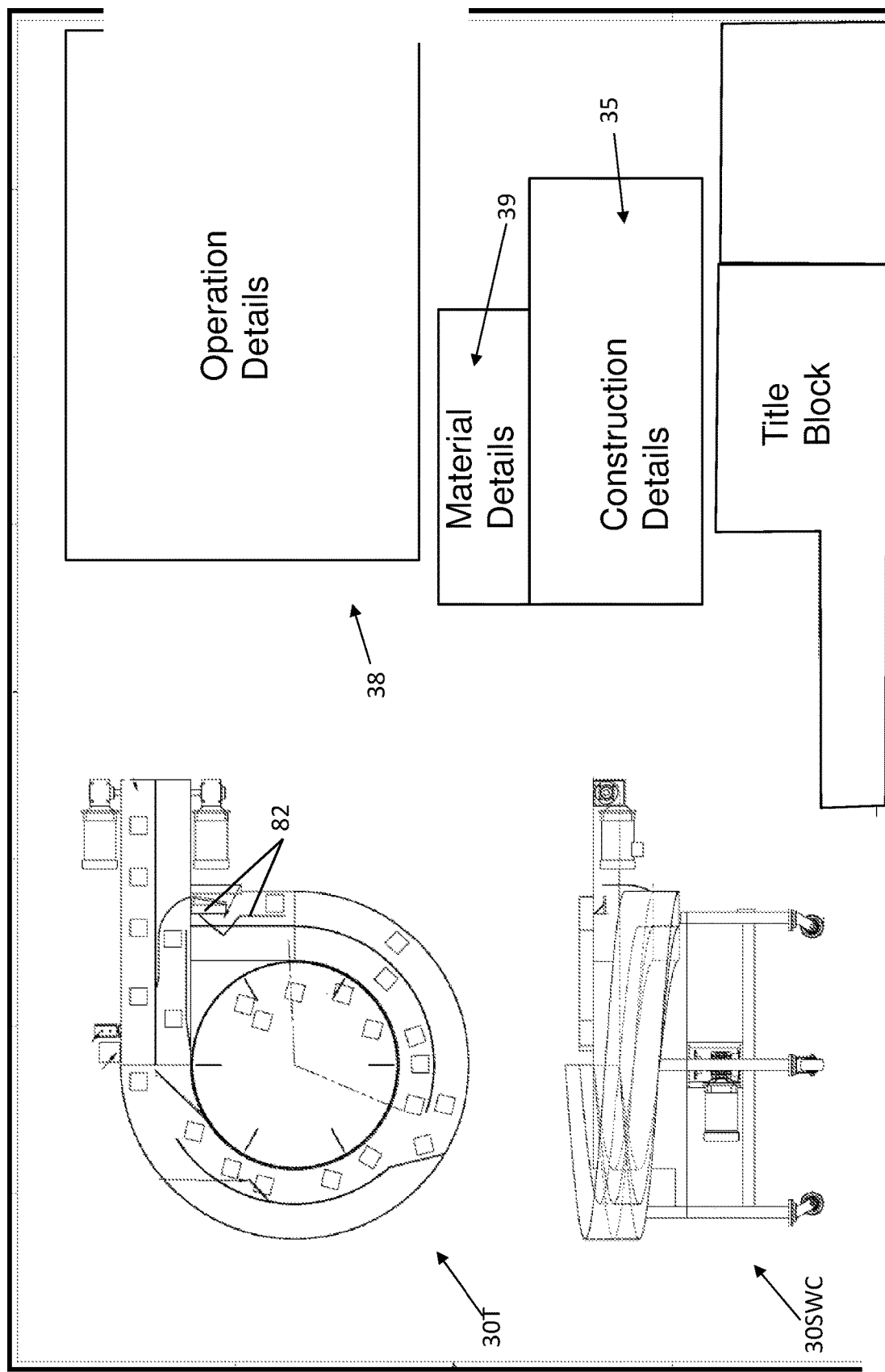
FIG. 7 is a design drawing with operation and material notes for the food grade feeder device and system for rolls, sandwiches, odd shaped edibles and foodstuff.

FIG. 7 is a design drawing 37 with operation and material notes for the food grade feeder device and system 30 for rolls, sandwiches, odd shaped edibles and foodstuff. Here the components and features are demonstrated again, including: a top view 30T of the food grade feeder device and system 30; a side view with wheels 30SWC of the food grade feeder device and system 30; a set of construction details 35; a design drawing 37 with operation and material notes for the food grade feeder device and system 30 for rolls, sandwiches, odd shaped edibles and foodstuff; an operation detail 38; and a group of material details 39.

The anticipated materials 39 include: for the part contact surfaces—an ABS Plastic Disc, a 304 Stainless Steel Tooling ring, a FDA approved Acetal belt material or equal for each conveyor, a 304 Stainless Steel Reorientation Cam, a 304 Stainless Steel Height Qualifier, Frame Construction—a 304 Stainless Steel Tubing with wash down casters and docking station. Sizes and construction details 35 anticipated are: Center Disc 50 inch diameter Minimum; Inner conveyors 45 inch diameter minimum; Outer conveyors 65 to 70 inch diameter minimum; three (3) wash down motor/gearbox w/ common part numbers; all bearings to be sealed and greasable with Zerk fittings and pointing outwardly for access; and, a drive pulley to be of a griptwist material or equal. As durable and high temperature composite materials are developed, it is anticipate they can replace some of the Stainless Steel components.

Figure 8:
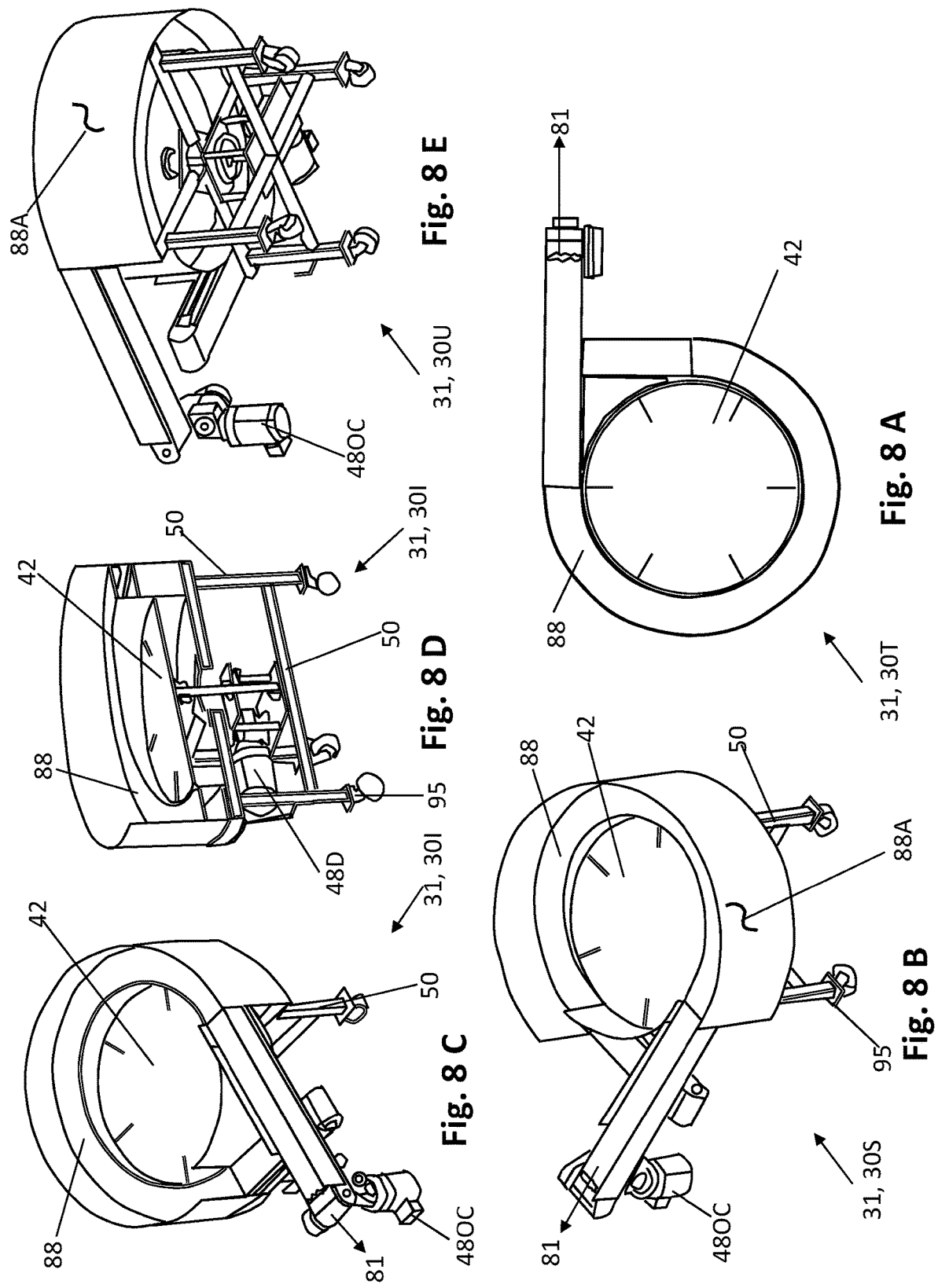

FIG. 8 A through 8 E a single conveyor version 31 of feeder system 31 for items that only need singulated or separated but not oriented for placement or use with another pick and place station. In these drawings are shown the single conveyor system 31 of the food grade feeder device and system 30 for separating and feeding one part at a time. Other common components depicted and shown (which are similar to the dual conveyor system) are the top, isometric and section views such as: a top view 31,30T of the food grade feeder device and system 30; an isometric view 31,30I of the food grade feeder device and system 30; a side view 31,30S of the food grade feeder device and system 30; a side view with wheels 31,30SWC of the food grade feeder device and system 30; an underneath view 31,30U of the food grade feeder device and system 30; a centrifugal feeder bowl 40; a selection sensor 41; a food grade ABS plastic, stainless steel, food grade composite materials, or equal durable material cone cap 42; a drive system 48IC—motor, gearbox, driven sprockets/pulleys and shaft for inside conveyor; a drive system 48OC—motor, gearbox, driven sprockets/pulleys and shaft for outside conveyor; a drive system 48D—motor, gearbox, chain/belts between drive and driven sprockets/pulleys between motor 48D and shaft 46; a support structure 50 under the food grade feeder device and conveyors; a set of wheels or castors 54 at the floor of the structure 50 legs; an electrical power and control panel 70 (not shown); a feeder operator control box 71 (not shown); a good food channel 81; an outside conveyor 88; an outside surface 88A of outside conveyor 88; a foodstuff and rolls 90 being singulated and fed through the food grade feeder device and system 30; and a set of support plate pads/feet 95 at the end of the legs of support structure 50.

Figure 9:
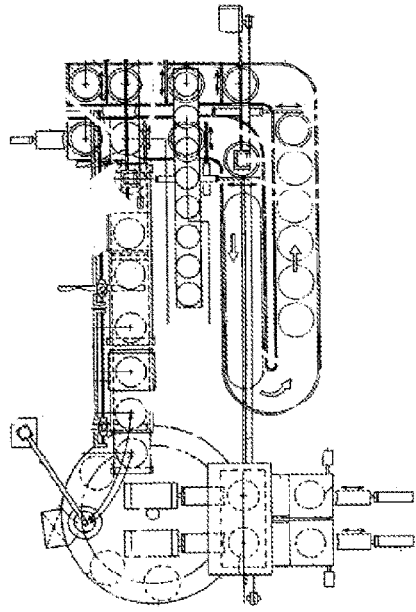
Figure 9:
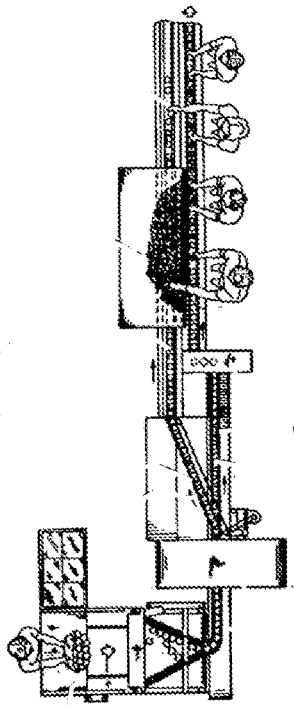
Figure 9:
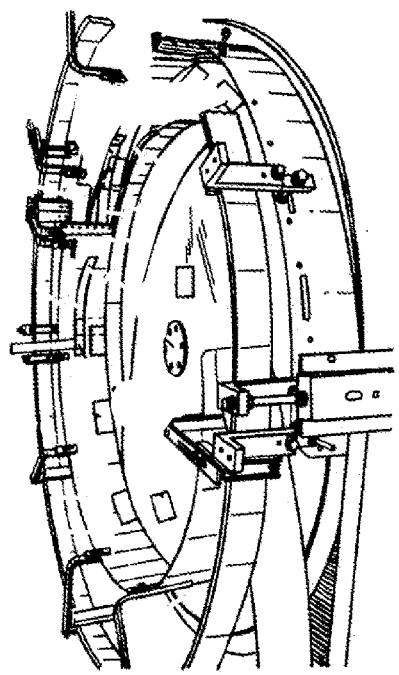
Figure 9:
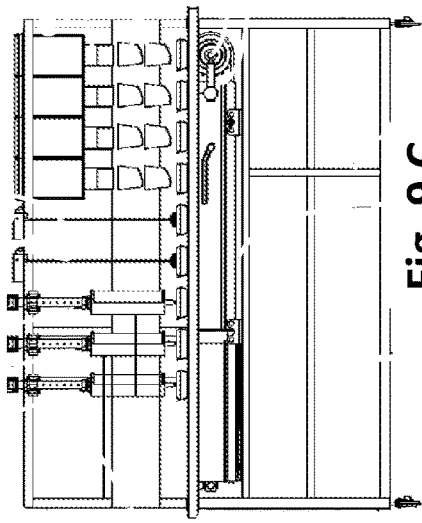

FIG. 9 A through 9 D are sketches of prior art. Here former patents and applications for food feeding machinery devices and systems are shown. These include: prior art 100 U.S. Pat. No. 5,299,675 by Schumann, et al. issued in 1994 is for a Pouch feeder method and device with angled rim; prior art 101 U.S. Pat. No. 5,540,943 by Naramura issued in 1996 is for a Sandwich preparation apparatus; prior art 102 U.S. Pat. No. 5,101,716 by Cones, Sr. et al. issued in 1992 is for an Apparatus for assembling biscuit sandwiches; and prior art 103 U.S. Pat. No. 9,532,575 by Donis, et al. issued in 2017 is for an Automated sandwich assembly unit. As can be seen, the novel food grade feeder device and system 30 for rolls, sandwiches, odd shaped edibles and foodstuff as compared to prior art is a unique combination and use as described herein.

The details mentioned here are exemplary and not limiting. Other specific components and manners specific to describing a food feeder device and system 30 may be added as a person having ordinary skill in the field of the art of food feeding equipment and their uses well appreciates.

Operation of the Preferred Embodiment

The food grade feeder device and system 30 for rolls, sandwiches, odd shaped edibles and foodstuff has been described in the above embodiment. The manner of how the device operates is described below. One notes well that the description above and the operation described here must be taken together to fully illustrate the concept of the new food feeder device 30. The preferred embodiment of the food grade feeder device and system for rolls, sandwiches, odd shaped edibles and foodstuff is comprised of: (a) a centrifugal feeder bowl 40 with a food grade ABS plastic, stainless steel, food grade composite materials, or equal durable material cone cap 42 and a rigid disk base plate 43; (b) a group of selection devices such as a selection sensor 41, a height qualifier plate 49, a flip and ramp device 82, a return channel 80 and a good food channel 81; (c) a support structure 50 with wheels 54; (d) an electrical drive motor and gear box 44 to rotationally turn/spin the centrifugal base plate 43 with a feeder vertical drive shaft 46 and at least two bearings 47 for rotationally securing drive shaft 46 to feeder support structure 50; and (e) an internal and external conveyors, each with a drive system (motor, gearbox, driven sprockets/pulleys and shaft for each conveyor) wherein the food grade feeder device and system organizes and aligns a foodstuff item such as rolls, sandwiches, odd shaped edibles, and other materials so that the organized foodstuff items can be transferred to other machinery or humans to further process and package the items.

The feeding system theory of operation is as follows:
A. rolls are dumped manually onto center disc;
B. center disc rotates clockwise and transfers rolls at random onto inner conveyor at the load area;
C. Inner conveyor and center disc speed approximately 50 feet per minute;
D. There is a vertical stainless steel "tooling ring" separating inner and outer conveyor at load area;
E. Rolls incline on inner conveyor to a height qualifying cam that rejects double stacked rolls back onto center disc for recirculation. Rolls are still in random orientation;
F. After rolls are single layer, they are directed to outer conveyor that is running at a speed of approximately 70 feet per minute;
G. The rolls gain separation between each other from the faster speed of outer conveyor;
H. The higher the speed difference between the inner and outer conveyor, the bigger the separation between rolls;
I. The selection sensor determines the orientation of the roll;
J. If the roll is right side up it allows it to pass downstream to slicer or next step in the process;
K. If roll is upside down, selection cylinder extends pushing the roll back onto the inner conveyor;
L. Upside down roll travels through return tooling to flip the roll right side up and onto the outer conveyor below;
M. The re-oriented roll travels unobstructed on the (faster) outer conveyor behind the load area;
N. Re-oriented rolls are directed back onto inner conveyor after the load area which always gives them "pole position" on the running surface; and
O. When downstream high level sensor on the slicer conveyor is satisfied, a high level reject cylinder extends and rejects all rolls back onto center disc for recirculation until sensor calls for product.

Many different uses are anticipated for the food feeder and system 30. Some examples, and not limitations, are shown in the following Table.

| ITEM | DESCRIPTION |
| --- | --- |
| 1 | sandwich rolls and buns |
| 2 | disk-like vegetables such as lettuce, onions, tomatoes |
| 3 | include preform meat patties |
| 4 | pre-cooked meats such as ham, hamburgers, turkey, pork, etc. |
| 5 | preformed cheese disks or strips |

With this description it is to be understood that the food grade feeder device and system 30 for rolls, sandwiches, odd shaped edibles and is not to be limited to only the disclosed embodiment of product. The features of the present invention 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms.

Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A food grade feeder device and system that is steam cleanable and comprised of:
   (a) a centrifugal feeder bowl (40) with a durable and food grade material cone cap (42) and a rigid disk centrifugal base plate (43);
   (b) a group of selection devices including a flip and ramp device (82) in series;
   (c) a support structure (50);
   (d) an electrical drive motor and gear box to rotationally turn/spin the centrifugal base plate (43) with a feeder vertical drive shaft and at least two bearings for rotationally securing drive shaft to feeder support structure; and
   (e) at least two conveyors, one conveyor being an internal conveyor and one conveyor being an external conveyors, and each of the at least two conveyors with a drive system including a motor, a gearbox, a driven sprockets/pulleys, and a shaft wherein the food grade feeder device and system feeds a group of foodstuff items one at a time and singulates and aligns the group of foodstuff items so that the group of foodstuff items is organized and can be transferred to other machinery and/or humans to further process and package the foodstuff items.

2. The food grade feeder device and system (30) in claim 1 further comprised with wheels (54) attached to the support structure (50).

3. The food grade feeder device and system (30) in claim 2 wherein the durable and food grade material of the cone cap is selected from a group consisting of a food grade ABS plastic, a stainless steel, and a food grade composite material.

4. The food grade feeder device and system (30) in claim 2 wherein the selection devices is selected from a group consisting of selection sensor (41), a height qualifier plate (49), a flip and ramp device (82), and a quantity sensor (93).

5. The food grade feeder device and system (30) in claim 2 wherein the foodstuff items are selected from a group consisting of rolls, sandwiches, odd shaped edibles, and other materials.

* * * * *